(No Model.) 11 Sheets—Sheet 2.

S. H. EDWARDS.
BOX NAILING MACHINE.

No. 482,866. Patented Sept. 20, 1892.

Witnesses:

Inventor:
Saml. H. Edwards
By his atty (No Model.)  S. H. EDWARDS.  11 Sheets—Sheet 3.
BOX NAILING MACHINE.

No. 482,866. Patented Sept. 20, 1892.

FIG. 3.

(No Model.) 11 Sheets—Sheet 4.

S. H. EDWARDS.
BOX NAILING MACHINE.

No. 482,866. Patented Sept. 20, 1892.

FIG. 4.

Witnesses:

Inventor:
Saml. H. Edwards
By his atty (No Model.) 11 Sheets—Sheet 7.

S. H. EDWARDS.
BOX NAILING MACHINE.

No. 482,866. Patented Sept. 20, 1892.

Witnesses:
Henry Drury

Inventor:
Saml H. Edwards
By his atty

(No Model.)

S. H. EDWARDS.
BOX NAILING MACHINE.

No. 482,866. Patented Sept. 20, 1892.

Witnesses:
Henry Truy

Inventor:
Saml. H. Edwards
By his atty (No Model.)  
11 Sheets—Sheet 9.

S. H. EDWARDS.
BOX NAILING MACHINE.

No. 482,866. Patented Sept. 20, 1892.

Witnesses:  
Inventor:  
Saml. H. Edwards  
By his atty (No Model.)  11 Sheets—Sheet 10.

S. H. EDWARDS.
BOX NAILING MACHINE.

No. 482,866.  Patented Sept. 20, 1892.

Witnesses:

Inventor:
Saml. H. Edwards
By his atty

(No Model.)  
11 Sheets—Sheet 11.

S. H. EDWARDS.
BOX NAILING MACHINE.

No. 482,866. Patented Sept. 20, 1892.

Witnesses:  
Inventor:  
Saml. H. Edwards

UNITED STATES PATENT OFFICE.

SAMUEL H. EDWARDS, OF BAYONNE, NEW JERSEY.

BOX-NAILING MACHINE.

SPECIFICATION forming part of Letters Patent No. 482,866, dated September 20, 1892.

Application filed April 27, 1891. Serial No. 390,595. (No model.)

*To all whom it may concern:*

Be it known that I, SAMUEL H. EDWARDS, of the city of Bayonne, county of Hudson, in the State of New Jersey, have invented an Improvement in Box-Nailing Machines, of which the following is a specification.

My invention relates to box-nailing machines; and it consists of certain improvements which are fully set out in the following specification and are shown in the accompanying drawings, which form a part thereof.

The object of my invention is to accomplish the nailing of boxes by means of machinery with rapidity and precision.

My invention is more particularly designed for nailing the lids upon boxes which have already been packed with merchandise for purposes of shipment, so that in large places of business, where the product is packed in boxes for shipment, the nailing of the lids upon the boxes may be accomplished with saving of time and labor.

In carrying out my invention I employ, in an organized machine, carriers or feeding devices to carry the boxes in succession to and from the machine, arranged to temporarily arrest the movement of the box for the purpose of having the lid applied thereto, with lid-feeding devices to feed the lids upon the boxes and nailing devices for holding and driving the nails, together with driving and timing mechanism for controlling the action of the different devices with reference to each other.

My invention includes certain novelties in the construction and mode of operation of the lid-feeding devices whereby the lids are fed in succession upon the boxes and are placed in exact position thereon for the proper driving of the nails. For this purpose I employ intermittently-reciprocating lid-holders adapted to receive the lids one at a time and carry them down upon the boxes and properly center them thereon.

My invention also includes certain novelties in the feeding devices for delivering the lids successively to the lid-holders and in the mechanism for operating them, whereby the mechanism for operating the lid-feeding devices is controlled by the boxes in passing into the machine, so that when the feeding of the boxes is for any reason interrupted the lid-feeding devices will be immediately thrown out of operation, but will be again started into operation when the feeding of the boxes is resumed.

My invention includes certain improvements in the construction of the nail-feeding and nail holding and driving devices and in the mechanism for operating them, which are fully described hereinafter.

My invention also includes mechanism for controlling the operation of the nail-feeding and nail holding and driving devices by means of the box in passing through the machine, and includes improvements in the support for the box while it is being operated upon and in the guides for guiding it to and from the support.

My invention also includes novel mechanism for controlling the supply of nails to the nail-feeding devices and in the manner of driving the different parts of the machine for the purpose of timing them in their relative operations, and in many novel combinations of parts and improvements of construction, which are fully set forth and claimed hereinafter.

In my improved box-nailing machine the boxes are fed in succession upon a support under the nail holding and driving devices, which are operated intermittently, their operation being controlled by the passage of the box. The lid is fed into position above the box and under the nail holding and driving devices, and is received by holders and by them it is carried down and is placed in proper position upon the box for the driving of the nails.

In the drawings, Fig. 2ª is a rear view of a portion of the machine shown in Fig. 2.

All of the views shown in Figs. 7 to 28, inclusive, are on an enlarged scale.

A is the base-frame of the machine.

A' A' are the upright side frames.

B is the bed-plate or supporting-frame, upon which the boxes are supported during the operation of nailing the lids upon them.

B' is a support for the bed-plate B, having an inclined guiding-face $b'$, upon which the lower inclined guiding-face $b$ of the bed-plate B rests. By moving this support B' longitudinally the bed-plate B may be raised and lowered for purposes of adjustment.

$B^2$ is an adjusting-screw for moving the support B', operated through the beveled gears $b^2$ by the hand-wheel $B^3$.

The support B' is guided in guides upon the base-frame A.

Figure 6:
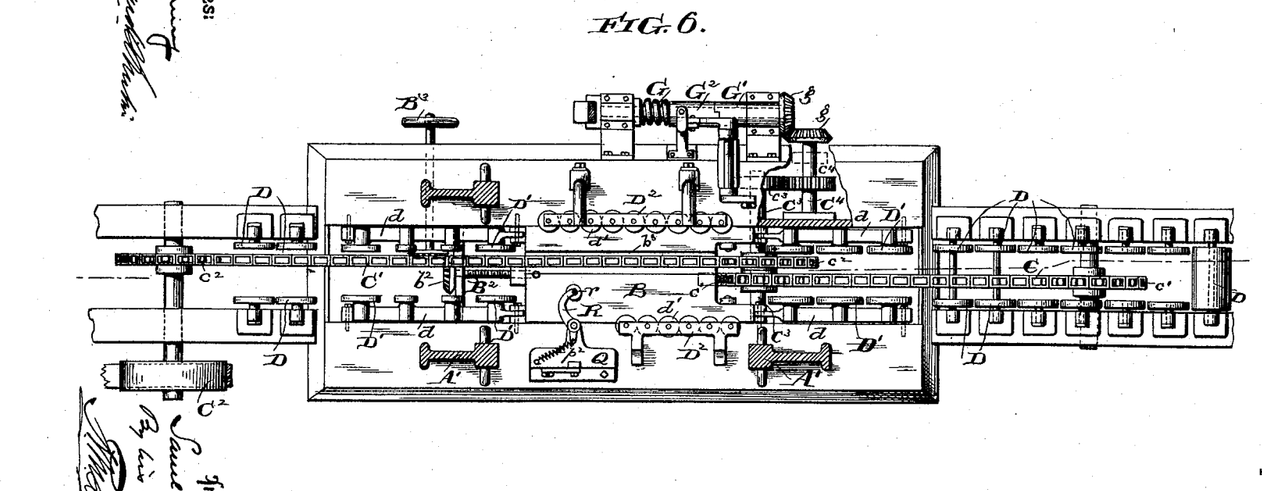
Fig. 6 is a horizontal sectional plan view of the machine on the line 4 4 of Fig. 2.

C and C' are respectively carriers or sprocket-chains for carrying the boxes to and from the bed-plate B, provided with carrying projections or lugs $c$. The box is conducted to the bed-plate B by the carrier C, and after the lid has been nailed it is conducted therefrom by the carrier C', as is hereinafter more fully set forth. The carriers C and C' are guided, respectively, over sprocket-wheels $c'$ $c'$ and $c^2$ $c^2$. Power is imparted to the shaft of one of these sprocket-wheels from a band-wheel $C^2$. One of the sprocket-wheels $c'$ of the carrier C is carried upon the shaft $C^3$ with one of the sprocket-wheels $c^2$ of the carrier C'. By this means the two carriers are driven by the same power. The carrier C extends to the bed-plate B, as is shown in Fig. 6, and has its upper or carrying surface substantially on a level therewith. The carrier C' passes over the bed-plate B through a groove or recess $b^3$ therein, so that its upper face is substantially level with the surface of the bed-plate. $A^2$ $A^2$ are guides for the boxes in being carried to and from the nailing devices.

D D are a series of antifriction rollers or wheels arranged at each end of the base-frame A, over which the box passes as it is conducted by the carriers C C' to and from the bed-plate B. D' D' are a second series of similar antifriction-rollers arranged within the openings of the base-frame A at each end of the bed-plate B and on each side of the carriers C and C', as is shown in Fig. 6. These rollers D' D' are carried by levers $d$, pivoted at one end to the base-frame A and at the other end to the bed-plate B, so that they will be raised or lowered with the movement of the bed-plate B for adjustment, and will thus be kept upon a substantial level with the surface thereof for the purpose of properly guiding the boxes to and from the bed-plate. The levers $d$ are free to move slightly on their pivots to permit this vertical adjustment.

Figure 3:
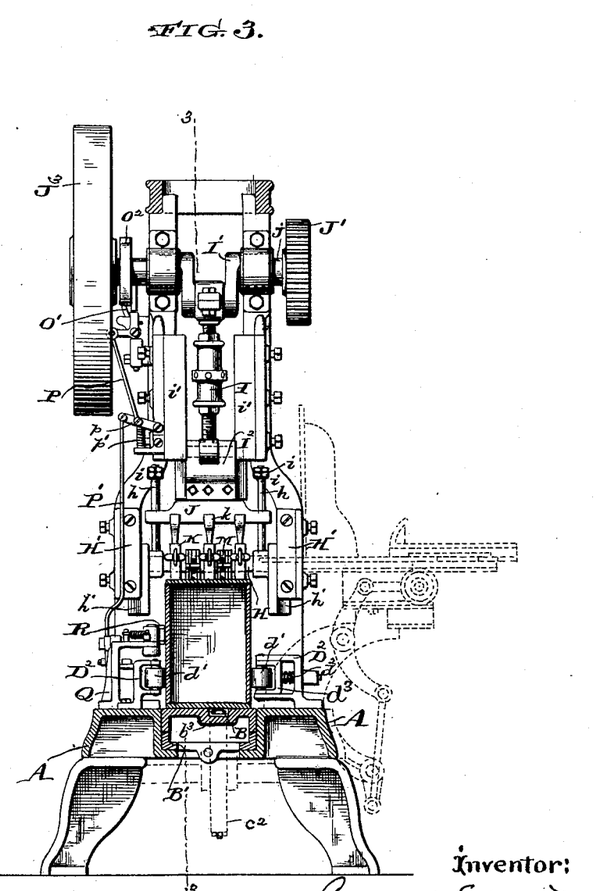
Fig. 3 is a vertical sectional view of the same on the line 1 1 of Fig. 2, looking toward the left.
Figure 4:
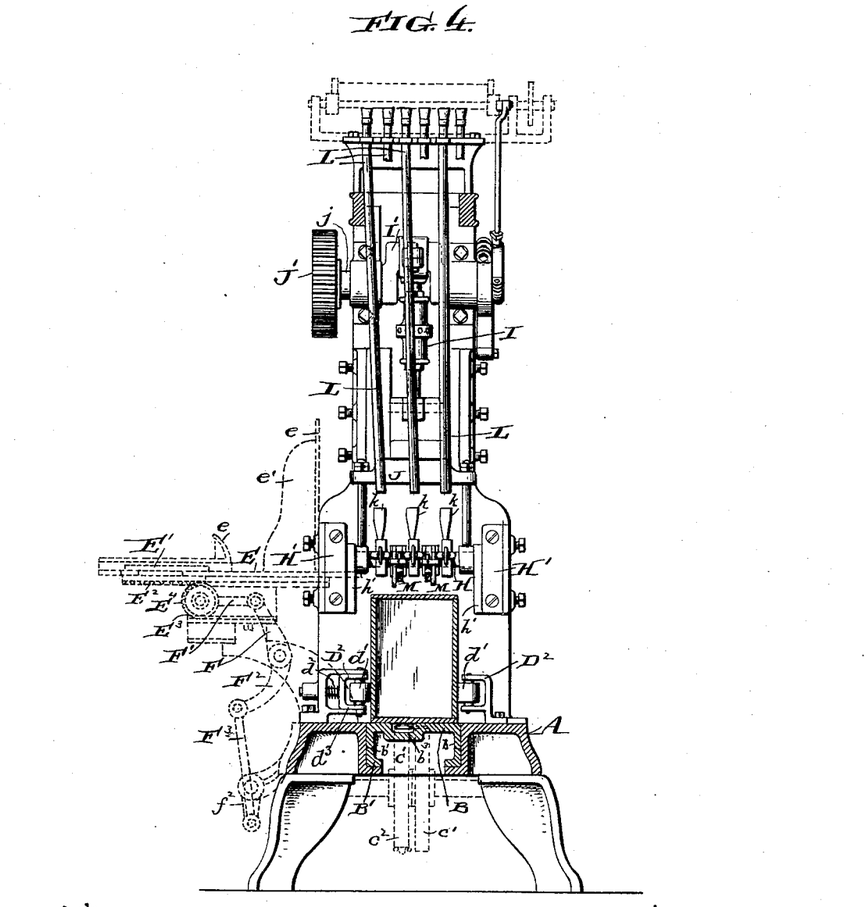
Fig. 4 is a similar view on the line 2 2 of Fig. 2, looking toward the right.

Upon each side of the bed-plate B and a slight distance above it are guiding and centering rollers $d'$, carried in suitable brackets $D^2$, one or both of which may be adjustable or yielding by the employment of springs $d^2$, (See Figs. 3 and 4.) The rollers $d'$ are carried in brackets $d^3$, movable in slots in the brackets $D^2$ and pressed outward by the springs $d^2$. These sets of guiding-rollers $d'$ $d'$ constitute a yielding guide for the box, located above the bed-plate B. The box is conducted between them and they guide and properly center it over the bed-plate.

Figure 5:
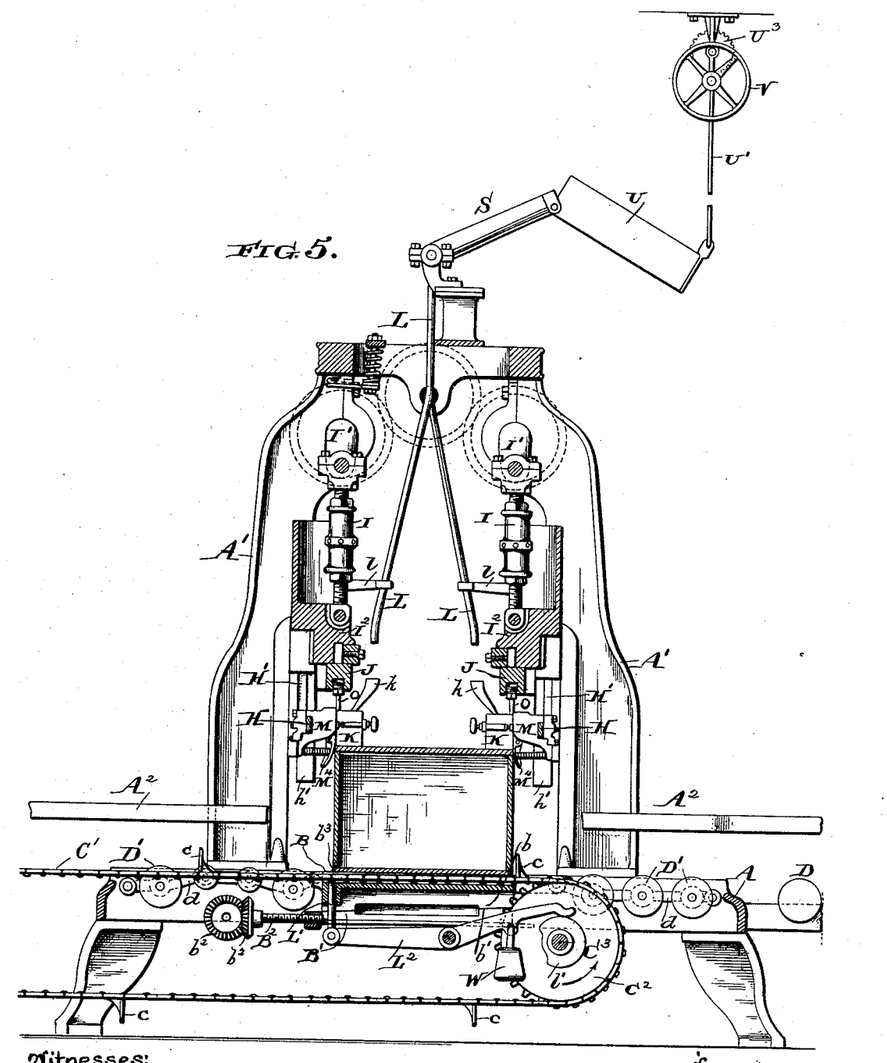
Fig. 5 is a longitudinal vertical sectional view on the line 3 3 of Fig. 3.

L', Fig. 5, is a stop to arrest the box upon the bed-plate B when in proper position thereon.

$L^2$ is a lever pivoted in the base of the frame A, carrying the stop L' and operated by a cam $l'$ upon the shaft $C^3$.

W is a weight for holding the end of the lever upon the cam $l'$.

When the box has been conducted upon the bed-plate B and has been brought in proper position thereon, the lid is placed upon it for the nailing operation to be performed.

Figure 1:
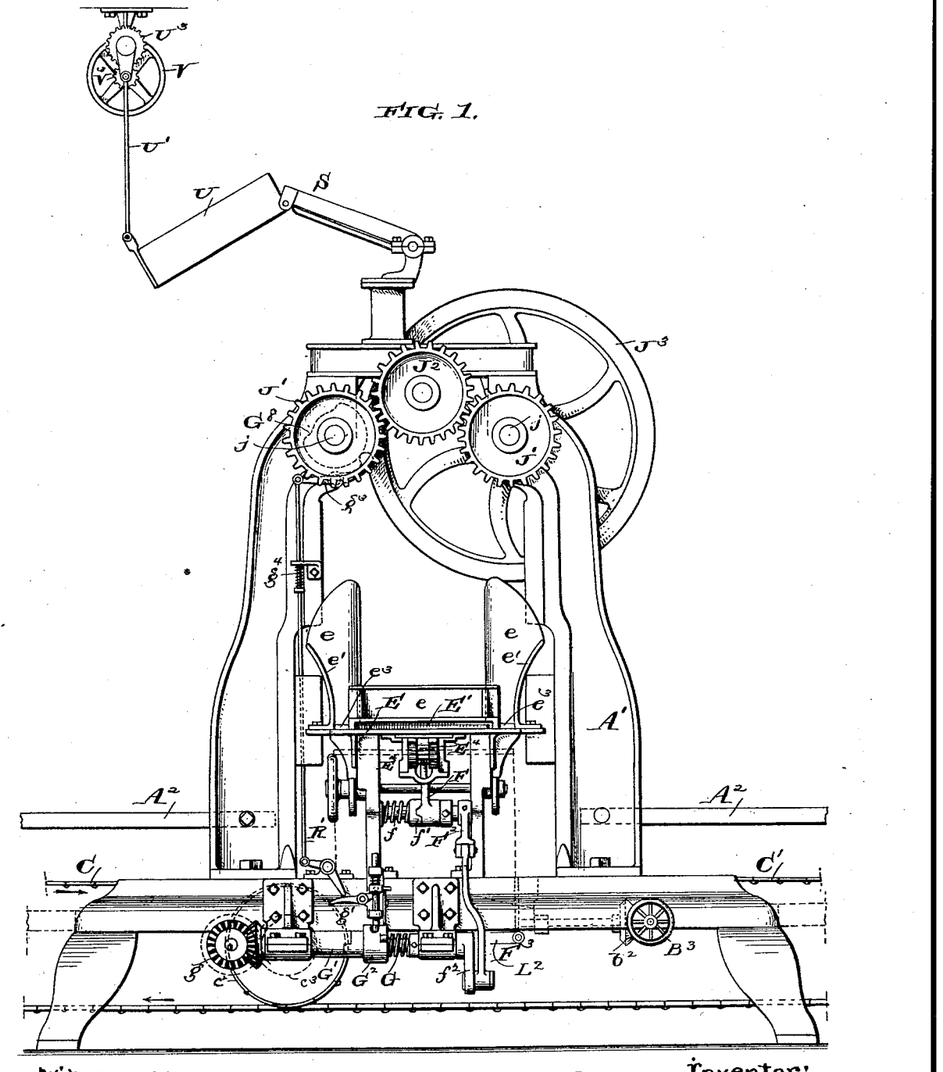
Figure 1 is a front elevation of my improved box-nailing machine.
Figure 2:
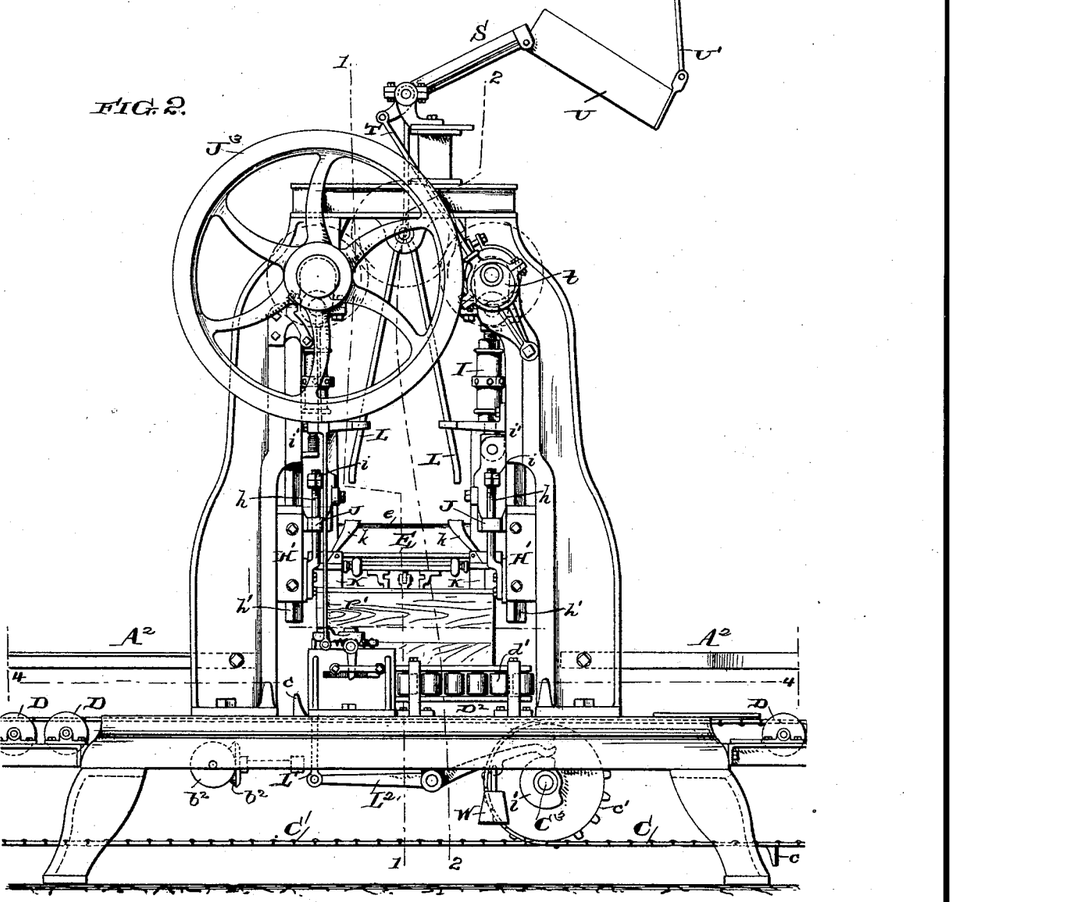
Fig. 2 is a rear view of the same.
Figure 2A:
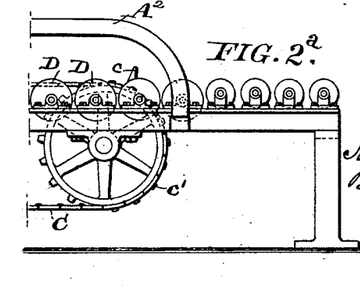
Figures 16, 18:
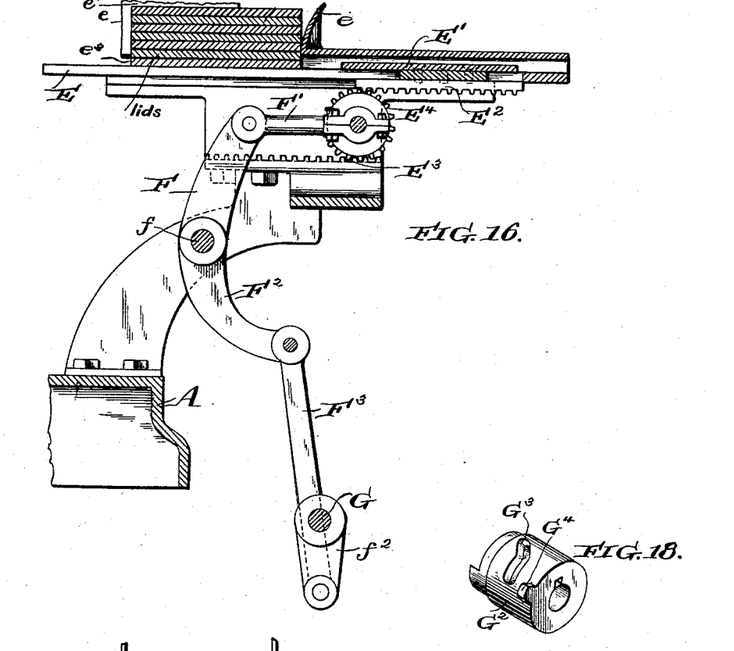
Fig. 16 is a sectional side elevation of the lid supporting and feeding mechanism.
Fig. 18 is a perspective view of the detached clutch.

I will now describe the devices for feeding the lids in position upon the boxes, referring more particularly to Figs. 1, 4, and 16. E is a table or support arranged upon one side of the machine adjacent to the position occupied by the top of the box when supported upon the bed-plate B. Extending above this table E are end and side guides $e$ $e'$, forming a feeding-hopper for a series of lids. The front end guides $e$ terminate in an opening $e^3$ immediately above the table E, through which a single lid may pass. E' is a pusher movable over the table E and connected through a slot in the table with racks $E^2$. $E^3$ are racks carried in brackets beneath the table E. $E^4$ are pinions engaging with the teeth of the racks $E^2$ $E^2$ and $E^3$ $E^3$. F' is an arm in which the pinions $E^4$ are journaled. This arm F' is hinged on an arm F upon a rock-shaft $f$. The arm F is connected with the rock-shaft $f$ through a spring-clutch $f'$, which is connected with the shaft $f$ with a feather or spline and is pressed into engagement with the arm F by a spring. $F^2$ is an arm secured to the rock-shaft $f$. $F^3$ is a connecting-rod connecting the arm $F^3$ with the crank $f^2$ of the shaft G. By the rotation of the crank $f^2$ the shaft $f$ is rocked through the rocking arm $F^2$ and the connecting-rod $F^3$. By the rocking of the shaft $f$ the arm F is rocked and the pinions $E^4$ are reciprocated between the racks $E^2$ $E^3$. This movement of the pinions produces a resultant movement in the pusher E', due to the reciprocation of the pinions by the rock-shaft $f$ and their rotation by the racks $E^2$ $E^3$, obtaining a large movement in the pusher with a small movement in the rock-shaft. The spring-clutch $f'$ forms a yielding connection between the rock-shaft $f$ and the arm F, so that in the case of a stoppage of the movement of a lid when carried by the pusher for any reason the clutch $f'$ would be pushed out of connection with the arm F, and the breaking of the parts would thereby be prevented.

Referring to Figs. 2, 3, 4, and 5, H are two cross-heads carrying upon their ends slides $h'$ $h'$, adapted to guides H' H' upon the main side frames A' A'. Carried by the slides $h'$ are upright rods $h$ $h$, provided with heads or stop-nuts $i$ $i$. I I are pitmen operated by the cranks I' I' and carrying slides $I^2$ $I^2$, which are adapted to guides $i'$ $i'$ in the upper part of the main side frames A' A'. Carried by the cross-heads H H are the nail-holders and lid-supporters, which are described hereinafter. J J are cross-heads carried by the slides $I^2$ $I^2$ and guided by the upright rods $h$ $h$ of the slides $h'$ $h'$. The cross-heads J J are adapted when raised by the action of the pitmen I I to strike the nuts $i$ $i$ upon the rods $h$ $h$, and thus to raise the slides $h'$ $h'$ and the cross-heads H H. O are hammers or nail-drivers carried by the cross-heads J J. K are the nail-holders, provided with funnels $k$ to receive the nails from the supply-tubes L. M are lid-supporters, which receive the lid from the pusher E' and support it in position above the box until the nailing devices are operated. The nail-holders K and lid-supporters M are carried by the cross-heads H. I prefer to employ two lid-supporters M upon each cross-head and three nail-holders and to arrange the lid-supporters M between the nail-holders K K, as shown in the drawings. By this means each end of the lid is supported at two points and is supplied with three nails.

The details of the nail-holders are shown in Figs. 10, 11, 12, and 13. K' is the main body of the nail-holder, having a bore $k'$ for the nail-hammer O, leading through the top. $K^2$ is an angular clamping-piece fastened to the rear of the part K' by screws $k^2$. The cross-head H is clamped between the main body portion K' and a clamping-piece $K^2$ by means of the clamping-screw $k^3$. $K^3$ is the front piece of the holder, carrying the nail-funnel $k$. The pieces K' and $K^3$ have their adjacent surfaces recessed to receive the blocks $K^4$ $K^4$ $K^5$ $K^5$, and are formed with the upper portions of their adjacent faces beveled and recessed to form when the pieces are put together an inclined passage $k^4$, communicating with the nail-funnel $k$. The bore $k'$ extends down between the blocks $K^4$ $K^4$ and communicates with the passage-way $k^4$. The lower blocks $K^5$ $K^5$ are pressed together by springs $k^5$ $k^5$ and close the bottom of the bore $k'$. The upper faces of the blocks $K^5$ $K^5$, adjacent to the end of the bore $k'$, are formed with an inclined recess or depression $k^6$. The blocks $K^4$ $K^4$ are pressed toward each other by springs $k^7$ $k^7$. The two parts K' $K^3$ are held together by means of bolts $K^9$, passing through lateral wings $k^8$, and a locking-yoke $K^6$ and clamping-screw $K^7$. By this construction the nail-holder K may be easily dismantled. The bolts $K^9$ are formed with grooves or diminished portions to receive the edges of the locking-yoke $K^6$.

Figures 10, 11, 12:
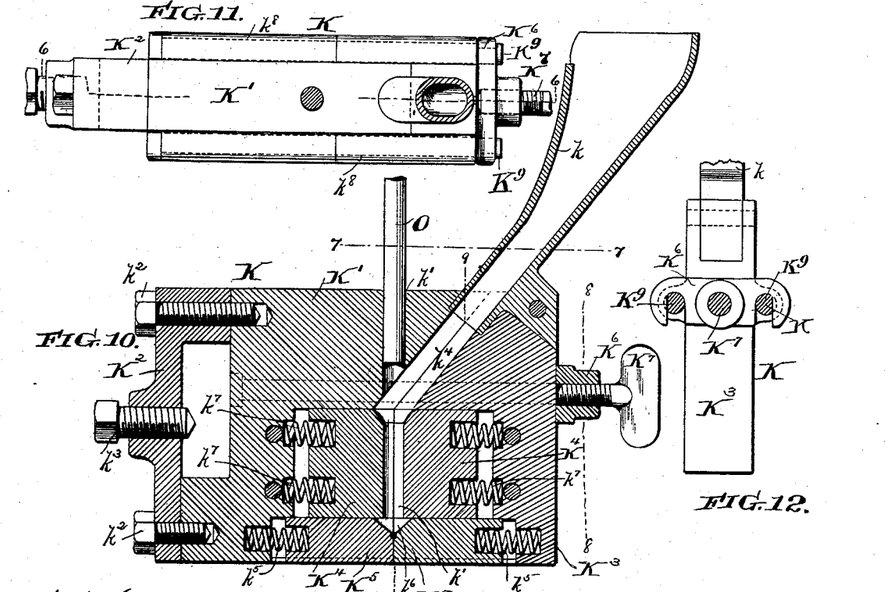
Fig. 10 is a longitudinal sectional view on the line 6 6 of Fig. 11 of one of the nail-holders.
Fig. 11 is a transverse sectional plan view of the same on the line 7 7 of Fig. 10.
Fig. 12 is a vertical sectional view of the same on the line 8 8 of Fig. 10.
Figure 13:
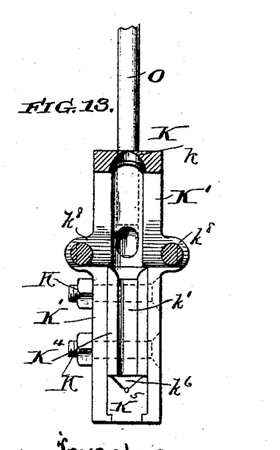
Fig. 13 is a vertical sectional view of the same on the line 9 9 of Fig. 10.

For convenience of construction the nail-holders may be made in parts held together by bolts $K^9$, Figs. 10 and 13, the pieces K' and $K^3$ being bolted between the outer or side parts. This is obviously not necessary to the construction of the nail-holder so far as the features of invention are concerned. By releasing the adjusting-screw and removing the yoke $K^6$ the front portion $K^3$ may be withdrawn from the part K'. A nail is delivered from the funnel $k$ through the passage-way $k^4$ into the lower part of the bore $k'$ between the blocks $K^4$ $K^4$ with its end resting in the recess $K^6$. When the hammer O descends and strikes the nail, the blocks $K^5$ $K^5$ are forced apart and allow the nail to be driven into the wood. I prefer to employ the upper spring-blocks $K^4$ $K^4$ for forming the lower portion of the bore $k'$, so that in case two nails or a bent or imperfect nail should be fed into the bore $k'$ the blocks $K^4$ $K^4$ may be forced apart when the hammer descends, and thus prevent jamming in the bore $k'$. Normally, however, there would be no movement of the blocks $K^4$ $K^4$ during the operation of the hammer O in driving the nails. If two nails were present in the bore $k'$, it will be seen that the useless nail will drop through between the blocks $K^5$ $K^5$ when they are forced apart by the passage of the nail that is being driven, and thus any irregularity in the feeding of the nails will not interrupt or change the normal operation of the nailing device. The spring-pressed blocks $K^4 K^4$ thus form a yielding passage or bore for the nails.

Figures 14, 15:
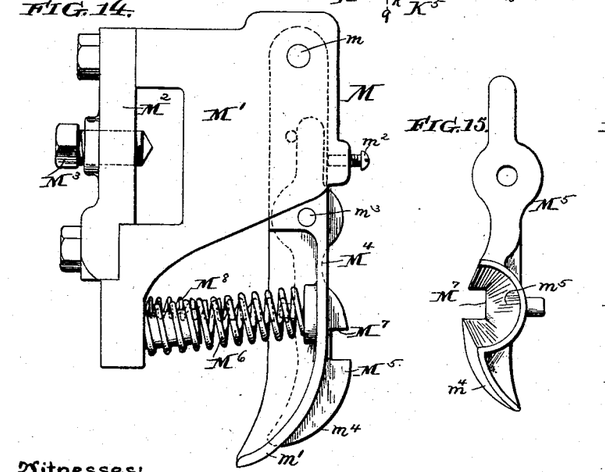
Fig. 14 is a rear elevation of one of the detached-lid supporters.
Fig. 15 is a front elevation of the detached-lid-supporting hook.

The devices for holding and supporting the box-lids are shown in Figs. 14 and 15. These devices consist of the main frame or bracket M′ (adapted for attachment to the cross-head H in any convenient manner, as by the clamping-piece $M^2$ and the screw $M^3$) and the spring-pressed guides $M^4$ and the hook $M^5$. The guide $M^4$ is pivoted to the bracket M′, as at $m$, and is provided with a curved extremity $m'$. $M^6$ is a spring between the bracket and guide $M^4$, normally pressing it outwardly. The outer movement of the guide $M^4$ under the action of the spring $M^6$ is limited and regulated by the adjustable stop $m^2$. The hook $M^5$ is pivoted to the guide $M^4$, as at $m^3$, and is provided with a curved extremity $m^4$, and an inclined guideway $m^5$, leading to a notch $M^7$. $M^8$ is a spring of less tension than the spring $M^6$, arranged between the bracket M′ and the hook $M^5$, acting to press it outwardly, so that the notch $M^7$ and curved extremity $m^4$ project beyond the edge of the guide $M^4$, as shown in Fig. 14. When the cross-heads H are raised, lifting the nail-holders K and the lid-supporters M, the hooks $M^5$ are brought in line with the pusher E′, and when a lid is pushed from the table E it is received in the notches $M^7$. The inclined guides $m^5$ guide the edges of the lid into the notches. The lid is thus supported over the box by the four hooks $M^5$. When the cross-heads H descend, the curved extremities $m^4$ strike the edges of the box and are moved outwardly until the notches $M^7$ are moved away from the lid, releasing it and permitting it to rest upon the top of the box. The curved guides $M^4$ act to guide and properly center the lid, so as to bring it into exact position upon the box for the driving of the nails. (See Fig. 5.)

Referring now to the main driving mechanism of the machine, J′ J′ are gear-wheels carried by the shafts $j j$ of the cranks I′ I′. $J^2$ is an intermediate gear-wheel between the gear-wheels J′ J′. $J^3$ is the main driving-wheel, loosely journaled upon one of the shafts $j$. O′ are the clutch devices for connecting and disconnecting the wheel $J^3$ with the shaft $j$. Normally the wheel $J^3$ rotates upon the shaft $j$, and there is consequently no operation of the pitmen I I or of the nailing devices carried by them. When a box is fed into the machine and is brought into position upon the bed-plate B to have the lid applied thereto, the clutch mechanism O′ is automatically operated to connect the driving-wheel with the shaft $j$, and thus reciprocate the pitmen I I and operate the nailing devices, and when the lid has been nailed to the box the clutch mechanism is automatically operated to disconnect the wheel $J^3$ until a second box is in position. The pitmen I I are thus operated intermittently by the action of intermediate mechanism controlled by the boxes in passing through the machine.

The particular form of clutch mechanism employed for connecting and disconnecting the wheel $J^3$ with the shaft $j$ is immaterial to my invention, which is concerned more particularly with the devices for controlling its action.

Figures 20, 21, 22, 23:
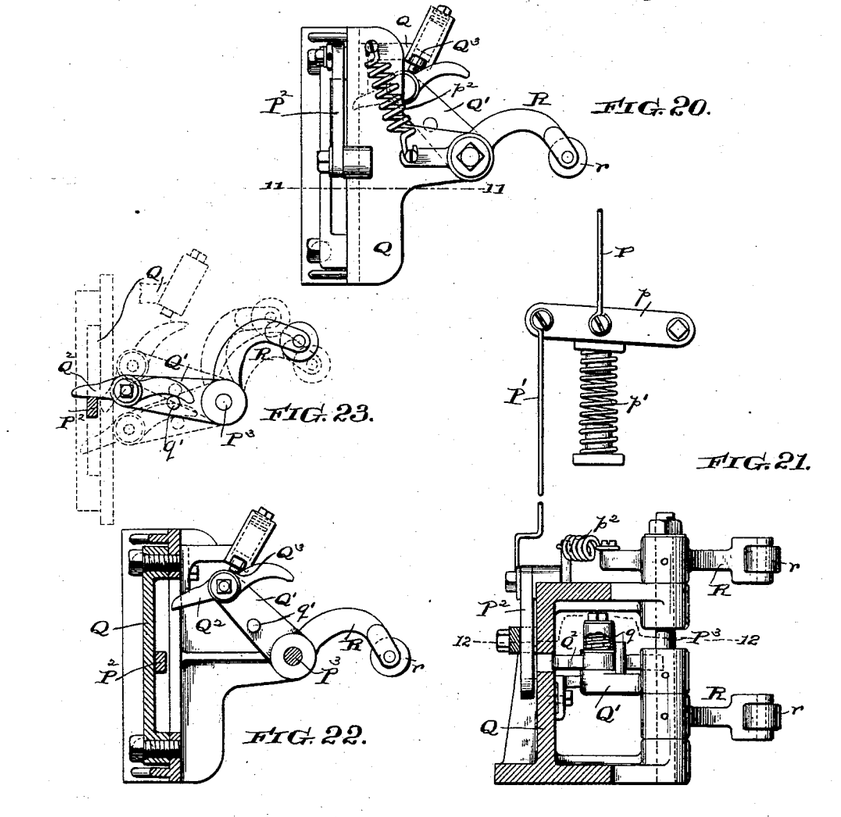
Fig. 20 is a plan view of the trip mechanism for controlling the clutch shown in Fig. 7.
Fig. 21 is a vertical sectional view of the same on the line 11 11 of Fig. 20.
Fig. 22 is a horizontal sectional view of the same on the line 12 12 of Fig. 21.
Fig. 23 is a diagrammatic view similar to Fig. 22, illustrating the operation of the trip mechanism.
Figure 24:
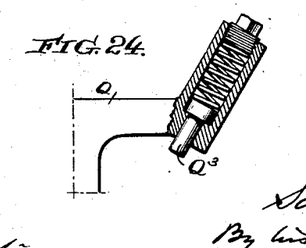
Fig. 24 is a sectional side elevation, upon an enlargement of the scale of Fig. 2, of the cushioning-stop for the trip.
Figure 25:
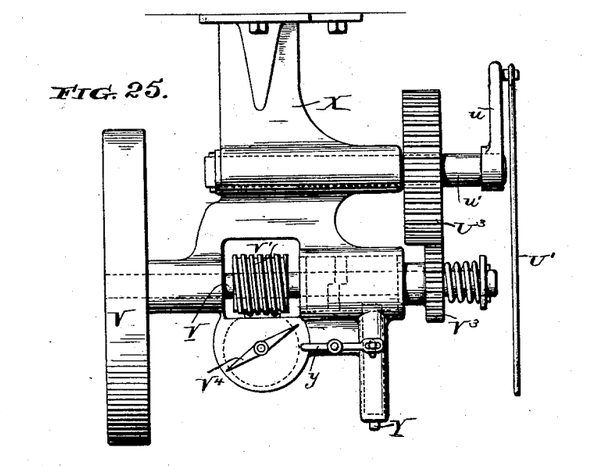
Fig. 25 is a side elevation of the driving and timing mechanism for operating the nail-supplying pan.

I will now describe the clutch mechanism shown in the drawings and the devices for controlling its operation, referring more particularly to Figs. 3, 6, 7, 8, 9, 20, 21, 22, and 23. The interior of the hub of the wheel $J^3$ is formed with grooves $j^2$. $J^4$ is an arm carried by a segmental piece $j^4$, journaled in a groove in the hub $j$ and adapted when turned to project into one of the grooves $j^2$ of the hub, thus locking the hub and the shaft $j$ together. This is a well-known form of clutch mechanism. $O^2$ is a cam secured to the shaft $j$. $j^5$ is a spring acting against the arm $J^4$ to move it and turn the piece $j^4$ into the groove of the shaft $j$. $O^3$ is a bell-crank pivoted to a frame $O^4$ upon the side of the machine, the end of which is adapted normally to lift the arm $J^4$ and hold the clutch out of operation. P is a rod connected with one member of the bell-crank $O^3$. The bell-crank $O^3$ thus constitutes a lock to lock the clutch out of connection. The rod P is connected with a lever $p$, Figs. 3 and 21. $p'$ is a spring acting to lift the lever and raise the rod P after it has been depressed. P′ is a rod connecting the lever $p$ with a bell-crank $P^2$, pivoted to a frame Q upon the base-frame of the machine. R R are two arms carried by a shaft $P^3$, journaled in arms of the frame Q. These arms R R project over the bed-plate B in the line of movement of the box in passing upon it, Fig. 6, and may be provided upon their extremities with antifriction-rollers $r\ r$. $p^2$ is a spring between the frame Q and an extension of one of the arms R to normally hold the arms R R, projecting over the bed-plate B. Q′ is an arm carried by the shaft $P^3$. $Q^2$ is a dog pivoted to the arm Q. $q$ is a spring to hold the dog $Q^2$ firmly upon the arm Q′. $Q^3$ is a cushioning-stop over the dog $Q^2$. $q'$ is a stop on the arm Q′. When the arms R R are moved by the box in passing upon the bed-plate B, the arm Q′ is moved correspondingly with the shaft $P^3$, and one arm of the dog $Q^2$ strikes one leg of the bell-crank $P^2$ and is moved by it until the other arm strikes the stop $q'$, which prevents further movement of the dog upon its pivot and causes it to rock the bell-crank $P^2$, correspondingly rocking the bell-crank $O^3$ and throwing the clutch mechanism into operation. After the dog $Q^2$ has rocked the bell-crank $P^2$ it slips past under the free end of the bell-crank $P^2$, (which is restored again to its normal position by the spring $p'$ after the operation of the clutch mechanism,) so that it will be in position to throw out the clutch mechanism O′ after one revolution of the shaft $j$. When the box has passed from the bed-plate B and the arms R R move back into their normal positions, the arm Q' simultaneously returns to its former position, and the dog Q², striking the arm of the bell-crank P², is turned and permits the arm Q to move back. The cushioning-stop Q³ strikes the dog Q² and returns it to its normal position, as is shown in Fig. 22. These movements of the dog Q² in operating the bell-crank P and returning to its former position are shown in Fig. 23.

Figure 7:
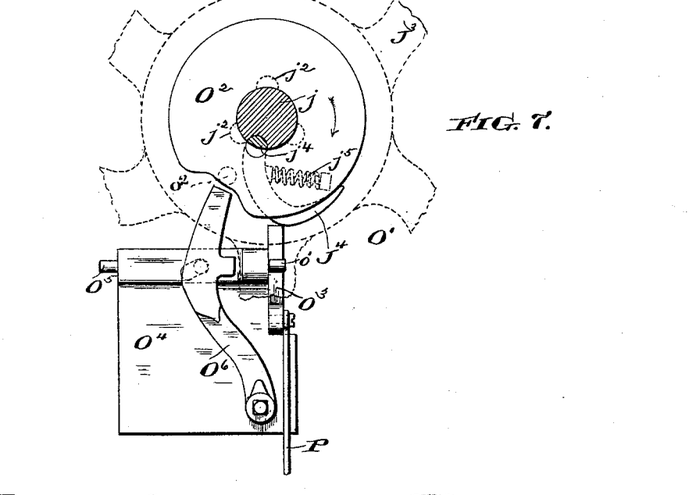
Fig. 7 is a front elevation of the clutch mechanism for intermittently connecting the nail carrying and driving plungers with the main driving-wheel.
Figure 8:
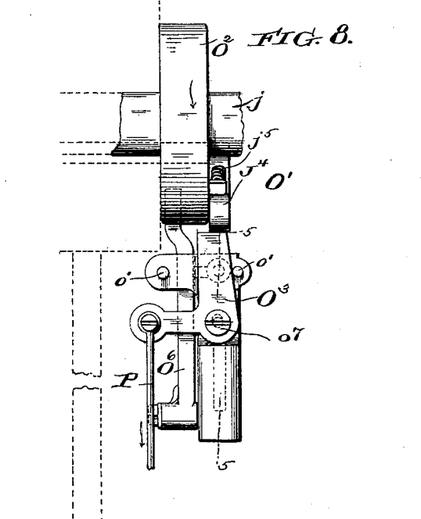
Fig. 8 is a side elevation of the same.
Figure 9:
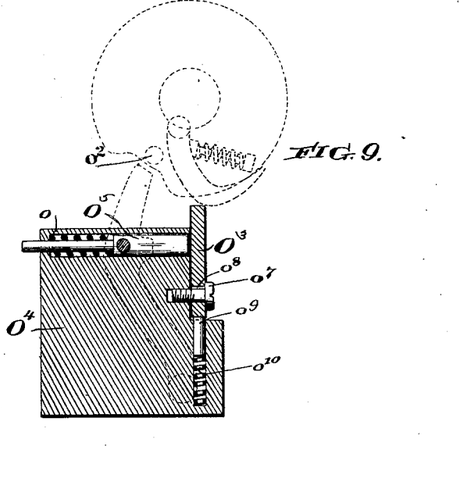
Fig. 9 is a vertical sectional view of the same on the line 5 5 of Fig. 8.

Referring again more particularly to the construction shown in Figs. 7, 8, and 9, O⁵ is a bolt carried in the frame O⁴ and normally pressed forward by a spring $o$. O⁶ is a lever pivoted to the frame O⁴ and connected to the bolt O⁵ to operate it against the action of the spring $o$. The free end of the lever O⁶ is arranged in the path of the cam O² and is adapted to be actuated by it. Normally the bell-crank O³ obstructs the opening for the bolt O⁵ in the frame, as is shown in Fig. 9. When, however, the bell-crank O³ is rocked and is moved from the opening, the bolt O⁵ is projected forward by the spring $o$ and holds the bell-crank from moving backward by the action of the spring $p'$ until the wheel J³ has turned upon the shaft $j$ sufficiently to bring one of the grooves $j^2$ into position for engagement with the segmental locking-piece $j^4$. At this moment the face of the cam O² strikes the end of the lever O⁶ and withdraws the bolt, permitting the bell-crank O to return to its normal position by the action of the spring $p'$. $o'$ $o'$ are stops to limit the movements of the bell-crank O³. This construction of the bolt O⁵, lever O⁶, and cam O² constitutes an automatic lock for locking the bell-crank from returning to its normal position before the clutch mechanism has been brought into operation. It will be seen that if the bell-crank were allowed to return instantly before the segmental locking-piece $j^4$ of the clutch mechanism were brought in connection with the groove of the hub of the driving-wheel it would act upon the dog J⁴ and lock the clutch mechanism out of operation, so that there would be no movement of the pitmen I I. $o^2$ (shown in dotted lines in Figs. 7 and 9) is a stop to limit the movement of the dog J⁴. The bell-crank O³ may be allowed slight vertical play upon its fulcrum-pin $o^7$ to prevent possible jamming by means of the slot $o^8$ at the pivot-point. A pin $o^9$, sliding in a socket in the frame O⁴, and pressed upward by a spring $o^{10}$, in contact with the bell-crank O³, normally holds the same in its highest position, while permitting it to move downward slightly upon its fulcrum-pin $o^7$.

The mechanism for controlling the operation of the lid-feeding devices is more particularly shown in Figs. 1, 6, 17, 18, and 19. Upon the shaft C³, which, as has been heretofore described, is operated by the carriers, is a gear-wheel $c^3$, by which motion is imparted to a counter-shaft C⁴ through a gear-wheel $c^4$ thereon. From the counter-shaft C⁴ the hollow shaft G' is rotated through the beveled gears $g$ $g$. The hollow shaft G' is journaled in boxes upon the base-frame. Journaled in the hollow shaft G' is the shaft G, by which the lid-feeding devices are operated, as has been heretofore described. G² is a spring slide-clutch carried on the shaft G and adapted to connect that shaft with the shaft G'. G³ is a curved cam-groove in the clutch G², and G⁴ is a lug thereon. G⁵ is a spring-pressed bolt adapted to engage the curved cam-groove G³, carried in a bracket G⁶, bolted to the base-frame A. $g'$ is a pivoted dog having one arm adapted to strike a pin on the bolt G⁵ for the purpose of liting it and the other arm adapted to be struck by an arm $g^2$ of a bell-crank G⁷, which is journaled upon the base-frame A. R' is a rod connecting one arm of the bell-crank G⁷ with a lever $g^3$, pivoted in the upper part of the machine. G⁸ (dotted lines in Fig. 1) is a cam carried by the shaft $j$, adapted to actuate the lever $g^3$ and the rod R'. The lever $g^3$ is depressed by the cam G⁸ lifting the bolt G⁵ through the rod R', bell-crank G⁷, and dog $g'$. $g^4$ is a spring normally acting against the action of the cam G⁸ to depress the rod R' and release the bolt G⁵. The shaft G is driven by the same power devices that drive the carriers C and C' independently of the main driving-wheel J³, and rotates at a less rapid rate of speed than the shaft $j$, which is driven by the main driving-wheel J³, and the cam G⁸ acts upon the lever $g^3$ so as to lift the bolt G⁵ with each revolution and carry it over the groove G³ in the clutch without engaging therein and operating the clutch. Normally the bolt would rest upon the surface of the clutch G² and would engage with the groove G³ therein; but when the shaft $j$ rotates, through the operation of the clutch mechanism O', which connects that shaft with the driving-wheel J³, the cam G⁸ will lift the bolt and carry it over the groove G³ without operating the clutch. Thus it will be seen that while the machine is operating normally without any interruption in the feeding of the boxes, the lid-feeding mechanism will operate continuously; but upon any interruption of the feeding of the boxes there will be a corresponding interruption in the rotation of the shaft $j$, and the cam G⁸ will not act to prevent the bolt engaging in the groove G³ and shifting the clutch G² so as to throw the lid-feeding devices out of operation. When the feeding of the boxes is resumed, however, the cam G⁸ is again put into operation, lifting the bolt G⁵ and allowing the clutch to again connect the shaft G and G'. When the shaft carrying the cam G⁸ is at rest, the end of the lever $g^3$ will enter the depressed portion of the cam G⁸, so that it will not be operated by the cam to lift the bolt G⁵.

Figures 17, 19:
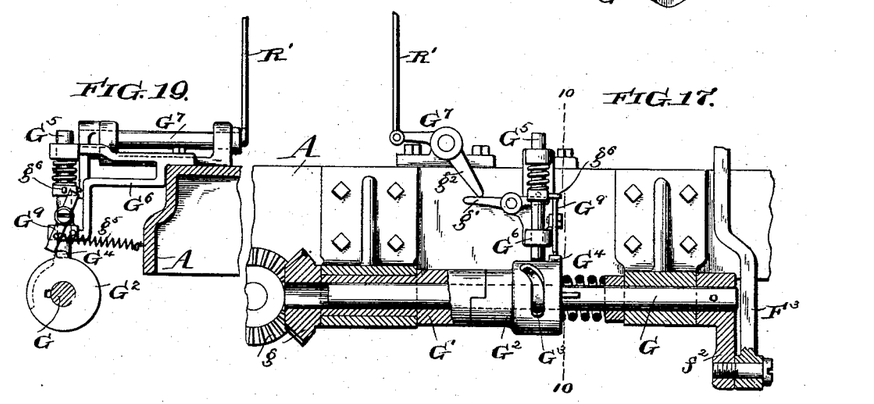
Fig. 17 is a front elevation of the clutch mechanism for controlling the operation of the lid-feeding device.
Fig. 19 is a vertical sectional view of the clutch mechanism on the line 10 10 of Fig. 17.

To render more certain the holding of the bolt G⁵ out of the groove G³ when the shaft $j$ operates, I employ a pivoted lock G⁹, which is adapted to be drawn by a spring $g^5$, so that its end will be brought under a pin $g^6$ upon the bolt G⁵ when the latter is raised by the action of the lever $g'$. This lock G⁹ will hold the bolt raised until the groove G³ is passed, even if the quick motion of the lever $g'$ should release it before. A lug G⁴ upon the clutch G², located adjacent to the extremity of the curved groove G³, strikes the lock G⁹ and releases it after the groove has passed.

It will be seen that both the nailing devices and the lid-feeding mechanism are controlled in their operation by the feeding of the boxes into the machine and that these devices will automatically cease to operate when the feeding of the boxes is interrupted.

S are the nail-feeding devices, by which the nails are fed one at a time to the nail-tubes L and thence are delivered to the nail-holders K. The nail-tubes L have their lower ends supported by arms $l$, Fig. 5, and correspond in number with the nail-holders. When the nail-holders are raised by the reciprocation of the cross-heads H, the funnels $k$ thereof are carried to the ends of the tubes L and receive therefrom the nails.

The particular construction of the nail-feeding devices S is immaterial to my invention, and any convenient mechanism for feeding one nail at a time to the tubes L may be employed. I prefer such mechanism as is set out in the Letters Patent No. 265,166, dated September 26, 1888, granted to Smith and Doig. These nail-feeding devices may be operated by a rod T, operated by an eccentric $t$ upon one of the shafts $j$, (see Fig. 2,) so that the feeding of the nails to the tubes L will be controlled by the rotation of the shafts $j$ $j$, and will thus be synchronous with the movement of the nail-holders.

For controlling the supply of nails in the nail-feeding mechanism I prefer to employ the devices shown in Figs. 25, 26, 27, and 28. The nail-supply pan U, Figs. 1, 2, and 5, which contains the general supply of nails and feeds them to the nail-feeding devices S, is hinged thereto and is adapted to be lifted, so as to be brought in the same plane therewith to permit the nails to pass from the supply-pan U to the nail-feeding devices S. U' is a connecting-rod pivoted to the outer end of the nail-pan U and connecting with a crank $u$, carried by a shaft $u'$, journaled in a bracket X. V is a driving-wheel upon a shaft $v$, also journaled in the bracket X and carrying a worm V', adapted to rotate a worm-wheel V².

Figures 26, 27, 28:
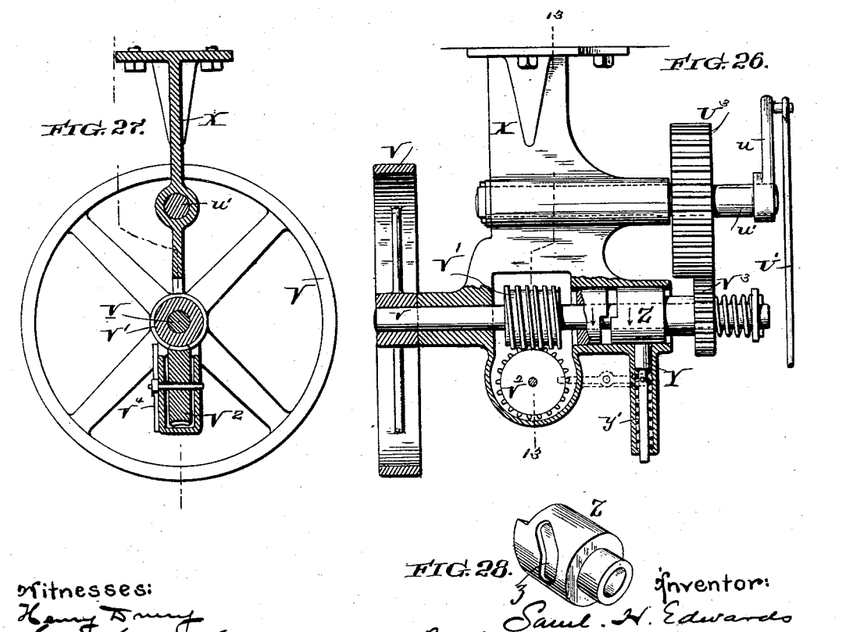
Fig. 26 is a view of the same similar to Fig. 25, with a portion of the inclosing frame in section to illustrate the operation of the clutch.
Fig. 27 is a vertical sectional view of the same on the line 13 13 of Fig. 26.
Fig. 28 is a perspective view of the detached clutch of Fig. 26.

Z is a spring-clutch upon the shaft $v$, carrying a gear-wheel V³, engaging with a gear-wheel U³ upon the shaft $u'$. The clutch Z is normally held out of engagement with the shaft $v$ by means of a bolt Y, engaging in a curved groove $z$ in the clutch. Carried by the worm-wheel V² is a finger V⁴, adapted to strike a lever $y$, connected with the bolt Y, and withdraw it from groove $z$ in the clutch and permit the clutch to engage with the shaft $v$. $y'$ is a spring to force the bolt Y back into engagement with the groove $z$. The gear-wheel U³ contains a greater number of teeth than the gear-wheel V³, so that a rotation of the latter will produce only a partial rotation of the former, preferably in the ratio of one to two. Normally the clutch Z is unconnected with the shaft $v$, and there is no rotation of the gears V³ and U³ or movement of the hinged nail-pan U. As the driving-wheel V rotates the finger V⁴ is moved into contact with the lever $y$ through the action of the worm V' and worm-wheel V². This instantly withdraws the bolt Y and connects the clutch Z with the shaft $v$. The gear V³ rotates and imparts motion to the gear U³ and shaft $v'$, lifting the pan U. A complete revolution of the gear V³ produces a half-revolution of the gear U³ and raises the pan U without again lowering it. At this moment the bolt Y engages the groove $z$, and acting upon the curved portion thereof withdraws the clutch Z, disconnecting the gear-wheel V³ from the shaft $v$ and stopping the rotation of the gear U³. The pan U thus remains in the raised position until the bolt is again withdrawn by the action of the fingers V⁴ and lever $y$, when it is lowered and remains in that position until the next operation. It will be seen that the worm-wheel V², which carries the fingers V⁴, rotates at a much slower rate of speed than the shaft $v$, so that a considerable interval of time will elapse between each raising and lowering of the pan U. This mechanism avoids the constant raising and lowering of the pan U with each operation of the machine, which is wholly unnecessary for the purpose of renewing the supply of nails and increases the wear of the parts. The driving-wheel V may be driven from the same shaft or source of power with the main driving-wheel J³ of the machine.

Having described the construction of my machine and the operation of the different parts thereof, I will now describe the operation of the machine as an entirety in nailing the lid upon the box. A box is placed upon the rollers D at the feeding side of the machine, and is carried forward by the lug $c$ of the endless feeding-carrier C between the guides A² A² over the guiding-rollers D' D' and upon the bed-plate B. The box is guided and centered upon the bed-plate B by the rollers or yielding guide $d'$ $d'$ and is stopped by the action of the stop L' and properly centered with reference to the lid supporting and nailing devices. Prior to the passage out of the previous box, which may be passed through the machine to start the same in operation, the pitmen I I are raised, lifting the cross-heads J J and the cross-heads H H, with the nail-holders K and the lid-supporters M. The nails from the tubes L are received in the funnels $k$ and pass into the bores $k'$. At the same time, through the operation of the lid-feeding devices, a lid has been pushed from the table E into the notches of the supporting-hooks M⁵. The movement of the pitmen I I is arrested by the operation of the clutch mechanism O' prior to the feeding in of the lid. As the box now passes upon the bed-plate B it strikes the arms R R, moving the arm Q', rocking the bell-crank P² in the manner heretofore described, and throwing the clutch O' into operation. The pitmen I I then descends until the lid rests upon the box released from the hooks M⁵ and the nail-holders K K are in position upon it for the driving of the nails. The motion of the cross-heads H is then arrested; but the cross-heads J J continue to descend, bringing the hammers O, carried thereby, down upon the nails in the holders K and driving them into the wood. When the box has had the cover thus nailed to it, the stop L' is moved out of the way by the action of the cam l' and the box is taken by one of the lugs c² of the carrier C', and is conducted out over the rollers D and D' on the other side of the machine, while the next box is being carried in by the carrier C. The lugs c of the carriers C and C' are so located with reference one to the other that the lugs of the carrier C' shall not come in contact with the box until the nailing operation has been completed. Meanwhile the pitmen I I have ascended, raising the cross-heads J J and H H to receive a new supply of nails, and a new lid is fed to the lid-supporters. The clutch mechanism in the meantime has been thrown out by the action of the arm J⁴ upon the bell-crank O³ and the movement of the plungers is arrested until the next box is moved upon the bed-plate B against the arms R R. If at any time the feeding of the boxes is interrupted, the clutch mechanism will not be operated, so that the pitmen I I will not descend and the operation of the lid-feeding devices will be arrested by the operation of the clutch G² in the manner heretofore described. While the machine is properly acting and feeding the boxes continuously in succession through the machine the lid-feeding devices will operate continuously, while the operation of the plungers is intermittent, in the manner heretofore described.

While I prefer the many details of construction which have been shown, they are not necessary limitations of my invention, as it is apparent that they may be varied in many ways without departing from it.

Having now described my invention, what I claim as new, and desire to secure by Letters Patent, is—

1. In a box-nailing machine, the combination of lid-feeding devices, reciprocating nail-holders and hammers, power devices for independently operating said lid-feeding devices and the nail-holders and hammers, and connecting mechanism between the power devices for operating the nail-holders and hammers and the devices for operating the lid-feeding devices to control the operation of the latter, whereby said lid-feeding devices may be automatically thrown out of operation when the action of the nail-holders and hammers is suspended.

2. In a box-nailing machine, the combination of lid-feeding devices to automatically feed the lids above the boxes, reciprocating lid-supporters to receive the lids successively from said feeding devices and deposit them upon the box, nail-holders to bring the nails in position upon the lid, and hammers to drive the nails from said nail-holders into the lid and box.

3. In a box-nailing machine, the combination of lid-feeding devices, reciprocating nail-holders and hammers, power devices for independently operating said lid-feeding devices and the nail-holders and hammers, connecting mechanism between the power devices for operating the nail-holders and hammers and the devices for operating the lid-feeding devices to control the operation of the latter, a clutch to throw the power devices for operating the nail-holders and hammers into and out of operation, and intermediate mechanism controlled by the box in passing to the machine to operate said clutch, whereby the operation of the lid-feeding devices, nail-holders, and hammers is controlled by the box in passing into the machine.

4. In a box-nailing machine, the combination of lid-feeding devices to automatically feed the lids above the boxes, reciprocating lid-supporters to receive the lids successively from said feeding devices and deposit them upon the box, reciprocating nail-holders to bring the nails in position upon the lid, means to reciprocate said lid-supporters and nail-holders synchronously, and hammers to drive the nails from said nail-holders into the lid and box.

5. In a box-nailing machine, the combination of feeding devices to feed the boxes successively to the machine, reciprocating nail-holders to bring the nails in position upon the box, reciprocating hammers to drive the nails from said holders into the box, power devices to reciprocate said nail-holders and hammers, a clutch to throw said power devices into and out of operation, and intermediate mechanism controlled by the box in passing through the machine to operate said clutch and cause the nail-holders and hammers to reciprocate.

6. In a box-nailing machine, the combination of lid-feeding devices, nail-holders and hammers, power devices to operate the lid-feeding devices and the nail-holders and hammers independently, a clutch to connect said lid-feeding devices with the power devices for operating them, and clutch-shifting devices to operate said clutch, controlled by the power devices for driving the nail-holders and hammers.

7. In a box-nailing machine, the combination of box-carriers to carry the boxes successively into the machine, nail-holders to hold the nails in position to be driven, hammers to drive the nails from the holders into the box, a support for a series of lids, a pusher to push the lids successively from said support over the top of the box and under the nail-holders and hammers, and power devices to reciprocate said pusher.

8. In a box-nailing machine, the combination of box-carriers to carry the boxes successively into the machine, nail-holders to hold the nails in position to be driven, hammers to drive the nails from the holders into the box, a support for a series of lids, a pusher to push the lids successively from said support over the top of the box and under the nail-holders and hammers, a rack and pinion to reciprocate said pusher, and means to operate said pinion.

9. In a box-nailing machine, the combination of box-carriers to carry the boxes successively into the machine, nail-holders to hold the nails in position to be driven, hammers to drive the nails from the holders into the box, a support for a series of lids, a pusher to push the lids successively from said support over the top of the box and under the nail-holders and hammers, a rotatable shaft, a pinion $E^4$, connection between said pinion and rotatable shaft to reciprocate the pinion, and racks $E^2$ $E^2$, between which said pinion is reciprocated, the pusher carrying one of said racks.

10. In a box-nailing machine, the combination of box-carriers to carry the boxes successively into the machine, nail-holders to hold the nails in position to be driven, hammers to drive the nails from the holders into the box, a support for a series of lids, a pusher to push the lids successively from said support over the top of the box and under the nail-holders and hammers, power devices to operate said pusher, a driving-shaft, a clutch to connect said power devices of the pusher and the driving-shaft, and means to operate said clutch controlled by the box in its passage through the machine.

11. In a box-nailing machine, the combination of carriers to carry the box to the machine, a pusher to feed the lids successively upon the box, nail-holders to hold the nails in position to be driven, hammers to drive the nails, an intermittently-operating stop to arrest the box under the nail-holders and hammers, and a carrier to carry the nailed box from the machine.

12. In a box-nailing machine, the combination of nailing devices, a driving-shaft, a clutch to connect said driving-shaft with the nailing devices, a projection arranged in the path of the box in passing to the machine, and operating connections between said projection and the clutch to connect the driving-shaft with the nailing devices, whereby the nailing devices are intermittently connected with the driving-shaft when the box passes to the machine.

13. In a box-nailing machine, the reciprocating frame M', carrying the notched lid-supports $M^5$.

14. In a box-nailing machine, the combination of the adjustable bed-plate B, rollers D', carried upon arms $d$, pivoted to said bed-plate, so as to be adjusted with it, and carriers C and C' for carrying the boxes to and from the bed-plate.

15. In a box-nailing machine, the reciprocating frame M', carrying the movable guides $M^4$ and the notched lid-supports $M^5$.

16. In a box-nailing machine, the combination of a reciprocating frame, pivoted lid-supporting hooks carried thereby, a pusher to push the lids successively to the pivoted supporting-hooks, nail-holders to hold the nails in position to be driven, and hammers to drive the nails.

17. In a box-nailing machine, the combination of a reciprocating frame and curved spring-pressed guides $M^4$ carried thereby, pivoted spring-pressed lid-supporting hooks $M^5$, movable with said reciprocating frame, and a pusher to push the lids successively to said hooks $M^5$, whereby when the reciprocating frame descends said hooks $M^5$ are pushed aside by the box and the lid is deposited thereon.

18. In a box-nailing machine, the combination, with a support for the box, of an intermittently-reciprocating frame, lid-supporters and nail-holders carried by said frame and reciprocating with it, intermittently-reciprocating hammers to drive the nails from said holders, and feeding devices to feed the lids successively to said lid-supporters under the nail-holders.

19. In a box-nailing machine, the combination, with a support for the box, of an intermittently-reciprocating frame, lid-supporters and nail-holders carried by said frame and reciprocating with it, intermittently-reciprocating hammers to drive the nails from said holders, nail-tubes to supply nails to said nail-holders, intermittently-operating nail-feeding devices to feed the nails to said nail-tubes, and feeding devices to feed the lids successively to said lid-supporters under the nail-holders.

20. In a box-nailing machine, the combination, with reciprocating nail-holders and hammers, of vertically-reciprocating lid-holders located under said nail-holders and hammers, adapted to receive the lid and carry it down upon the box, and power devices to reciprocate said nail-holders and hammers and lid-holders.

21. In a box-nailing machine, the reciprocating frame M', carrying the spring-pressed guides $M^4$, having the curved extremities $m'$ and the spring-pressed lid-supports $M^5$.

22. In a box-nailing machine, the reciprocating frame M', carrying the notched lid-supports $M^5$, having the curved extremities $m^4$, and the springs $M^8$, acting upon the lid-supports $M^5$ to press them outward.

23. In a box-nailing machine, the combination of the pitmen I I, power devices to reciprocate said pitmen intermittently, cross-heads J J, carried by said pitmen I I, hammers O, carried by said cross-heads, cross-heads H H, carried by said cross-heads J J, but movable thereon, nail-holders K, and lid-supporters M, carried by said cross-heads H H.

24. In a box-nailing machine, the combination of the reciprocating nail-holders and hammers, power devices to reciprocate said nail-holders and hammers, a clutch to connect said power devices with the main driving-wheel, a lock to lock said clutch out of connection, a carrier for the box to carry it into the machine under the nail-holders and hammers, a pivoted stop in the path of said box, and connections between said pivoted stop and lock whereby the lock is released upon the passage of a box into the machine and the clutch is thrown into connection.

25. In a box-nailing machine, the combination of reciprocating nail-holders and hammers, power devices to operate them, a clutch to connect said power devices, a lock to lock said clutch out of operation, a bell-crank $P^2$, connected with said lock, a pivoted arm R, arranged in the path of the box in passing under the nail-holders and hammers, so as to be pushed aside by it, and a pivoted dog $Q^2$, moving with said arm R, adapted to actuate the bell-crank $P^2$ and withdraw the lock of the clutch, substantially as and for the purpose described.

26. In a box-nailing machine, the combination of the main driving-wheel, reciprocating nail-driving devices, a shaft $j$, from which said reciprocating nail-driving devices are operated, a clutch to connect the main driving-wheel and shaft $j$, a lock $O^3$ to lock said clutch out of operation, the cam $O^2$, carried by the shaft $j$, the spring-pressed bolt $O^5$, and the lever $O^6$, connected therewith, and mechanism to operate the lock $O^3$, controlled by the box in passing through the machine, all combined and operating substantially as and for the purpose described.

27. In a box-nailing machine, the combination of carriers to carry the boxes into and from the machine, power devices to drive said carriers, lid-feeding devices to feed the lids in succession upon the boxes, connections between the lid-feeding devices and the driving devices of the carriers to operate them synchronously, reciprocating nail-holders and hammers, and power devices to reciprocate said nail-holders and hammers intermittently and independently of driving of the carriers, and connecting mechanism between the clutch and the power devices for reciprocating the nail-holders and hammers to operate the clutch and disconnect the lid-feeders and driving devices of the carriers when the nail-holders and hammers cease operating.

28. In a box-nailing machine, the combination, with reciprocating nail-holders and hammers, of nail-tubes to supply the nails to the nail-holders, nail-feeding devices to feed the nails one at a time to the nail-tubes, a nail-supply pan for supplying the nails to said nail-feeding devices, and intermittently-operating power devices to intermittently raise and lower said nail-supply pan.

29. In a box-nailing machine, the combination, with reciprocating nail-holders and hammers, of tubes to supply the nails to the nail-holders, nail-feeding devices to feed the nails one at a time to the nail-tubes, a nail-supply pan hinged to said nail-feeding devices and adapted when raised to supply nails thereto, a crank-shaft and connections between said crank-shaft and pan, a main driving-shaft, gearing between said main driving-shaft and crank-shaft, and a clutch for disconnecting said gearing and main driving-shaft, intermittently connected with said driving-shaft.

30. In a box-nailing machine, the combination, with reciprocating nail-holders and hammers, of nail-tubes to supply the nails to the nail-holders, nail-feeding devices to feed the nails one at a time to the nail-tubes, a nail-supply pan hinged to said nail-feeding devices and adapted when raised to supply nails thereto, a crank-shaft and connections between said crank-shaft and pan, a main driving-shaft, gearing between said main driving-shaft and crank-shaft, a clutch for disconnecting said gearing and main driving-shaft, having a curved groove $z$, the bolt Y, lever $y$, finger $V^4$, and worm $V'$, and worm-wheel $V^2$, combined and operating substantially as and for the purpose set forth.

31. In a box-nailing machine, the combination, with the hammers, of the nail-holders K, consisting of the main body portion $K'$, the front portion $K^3$, formed with the nail-bore between them, the connecting-bolts for connecting said parts $K'$ and $K^3$ together, the yoke $K^6$, and screw $K^7$, combined substantially as and for the purpose described.

In testimony of which invention I have hereunto set my hand.

S. H. EDWARDS.

Witnesses:
ERNEST HOWARD HUNTER,
J. A. BRAMLEY.